(12) United States Patent
Hamm et al.

(10) Patent No.: US 7,461,905 B2
(45) Date of Patent: Dec. 9, 2008

(54) INTEGRAL BRAKE FOR A MOTORBIKE

(75) Inventors: Markus Hamm, Munich (DE); Juergen Woywod, Moerfelden (DE)

(73) Assignee: Continental Teves Ag & Co. OHG, Frankfurt A.M. (DE)

( * ) Notice: Subject to any disclaimer, the term of this patent is extended or adjusted under 35 U.S.C. 154(b) by 237 days.

(21) Appl. No.: 11/248,453

(22) Filed: Oct. 12, 2005

(65) Prior Publication Data
US 2006/0082216 A1    Apr. 20, 2006

(30) Foreign Application Priority Data
Oct. 20, 2004   (DE)   ........................ 10 2004 051 119

(51) Int. Cl.
*B60T 13/00* (2006.01)
(52) U.S. Cl. .................. 303/9.64; 188/344; 188/345
(58) Field of Classification Search .............. 303/9.64; 1/137; 188/344, 345
See application file for complete search history.

(56) References Cited

U.S. PATENT DOCUMENTS 5,544,946 A * 8/1996 Toyoda et al. .............. 303/9.64
6,273,523 B1 * 8/2001 Wakabayashi et al. ..... 303/9.61
6,409,285 B1 * 6/2002 Wakabayashi et al. ..... 303/9.64
2003/0015916 A1 * 1/2003 Sakamoto ................... 303/137

FOREIGN PATENT DOCUMENTS

| EP | 1 277 635 A2 | 1/2003 |
| JP | 2000 071963 A | 3/2000 |
| JP | 2000071963 | 3/2000 |

OTHER PUBLICATIONS

European Patent Office Search Report dated Jan. 25, 2006 (2 pages).

* cited by examiner

*Primary Examiner*—Bradley T King
(74) *Attorney, Agent, or Firm*—Flynn, Thiel, Boutell & Tanis, P.C.

(57) ABSTRACT

The invention relates to an integral brake for a motorbike. The integral brake is designed in such a way that if the footbrake lever or the handbrake lever is additionally activated after the footbrake lever or the handbrake lever is already activated, an optimum distribution—corresponding to the aimed-at increased deceleration of the motorbike—of the braking forces applied to the front and rear wheels is brought about without influencing the pressure prevailing in the handbrake cylinder.

6 Claims, 3 Drawing Sheets

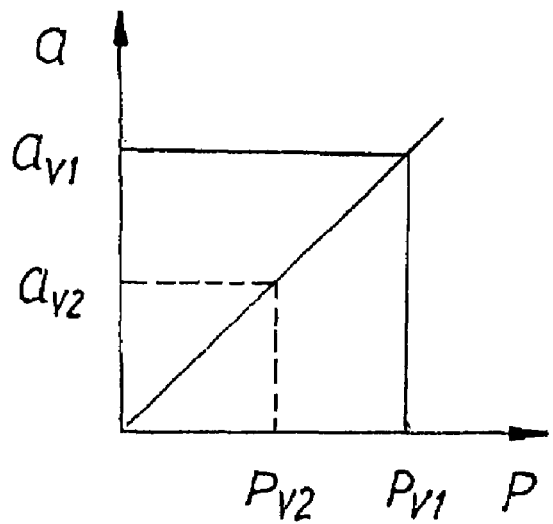 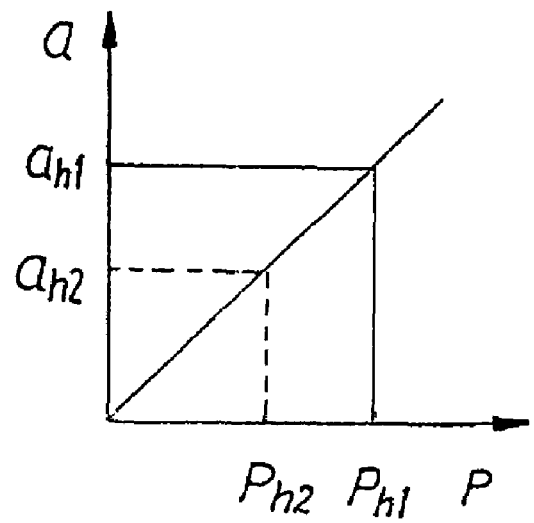
Fig. 2          Fig. 3
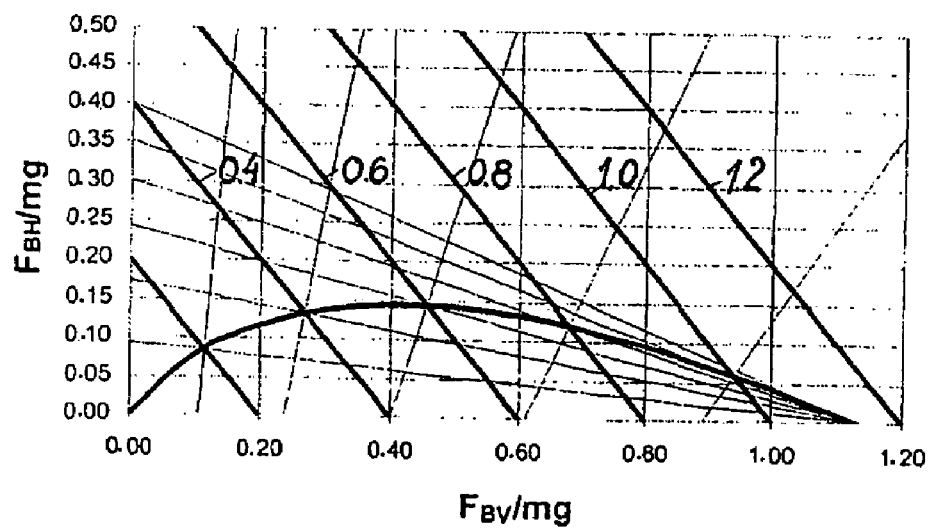
Fig. 4 ically in FIG. 1, for...

INTEGRAL BRAKE FOR A MOTORBIKE

CROSS-REFERENCE TO RELATED APPLICATIONS

This application is based on German Application No. 10 2004 051 119.5, filed Oct. 20, 2004, which is hereby incorporated herein in its entirety.

FIELD OF THE INVENTION

The invention relates to an integral brake for a motorbike. Such an integral brake can be used, by optionally activating the handbrake lever or the footbrake lever, to activate both the hydraulic brake devices assigned to the front wheel and the hydraulic brake devices assigned to the rear wheel. In order to bring about optimum distribution of the braking forces occurring at the front and rear wheels, the activation force of the individual brake devices is determined by an electronic control unit. After the braking process has been initiated using the handbrake lever, it is possible to generate an additional braking force by activating the footbrake lever, or vice versa. Since this additional braking force which is generated using the footbrake lever or using the handbrake lever is superimposed on the braking force which has already been generated using the handbrake lever or using the footbrake lever, it is necessary to re-adjust the activation forces of the brake devices acting on the front and rear wheels in order to obtain a desired braking force distribution again.

BACKGROUND OF THE INVENTION

JP 2000071963 A describes such an integral brake for a motorbike. As a result of the hydraulic connection of the brake components, reactions relating to the activation path of the brake levers occur during the simultaneous activation of the two brake devices. When only one brake device is activated using the handbrake lever or footbrake lever, the pressure/volume identifier of the brake system determines the activation path/braking pressure (deceleration) ratio. If the second brake lever is then additionally activated, the pressure/volume identifier of the second brake circuit changes considerably since braking pressure has already been increased by the integral effect using the pressure modulator in the second brake circuit. The second brake lever is "hard", and the activation path/braking pressure ratio has changed. If both brake levers are activated and if the braking pressure in one brake circuit is increased, the lever position of the second brake lever changes even if the braking pressure is also increased in this brake circuit (depending on the distribution of braking force) and brake fluid volume is thus displaced. These feedback reactions to the brake lever which is respectively activated first have a disruptive effect on the rider. This applies in particular to the reaction of the handbrake lever because the hand is significantly more sensitive than the foot.

SUMMARY OF THE INVENTION

The invention is based on the object of improving this known integral brake to the effect that when both brake levers are activated the pressure prevailing in the handbrake cylinder remains unaffected so that there is no feedback at the handbrake lever.

The means of achieving this object, and expedient developments of the invention, emerge from the claims.

BRIEF DESCRIPTION OF THE DRAWINGS

Two exemplary embodiments of the invention are illustrated schematically in the drawings and will be explained in more detail below. In the drawings:

FIG. 2 is a diagram illustrating the relationship between the hydraulic pressure generated using the handbrake lever and the deceleration factor which is achieved as a result of this, FIG. 3 is a diagram illustrating the relationship between the hydraulic pressure generated using the footbrake lever and the deceleration factor which is achieved as a result of this, FIG. 4 is a diagram illustrating the distribution of the braking force to the front and rear wheels.

DETAILED DESCRIPTION OF THE INVENTION

Figure 1:
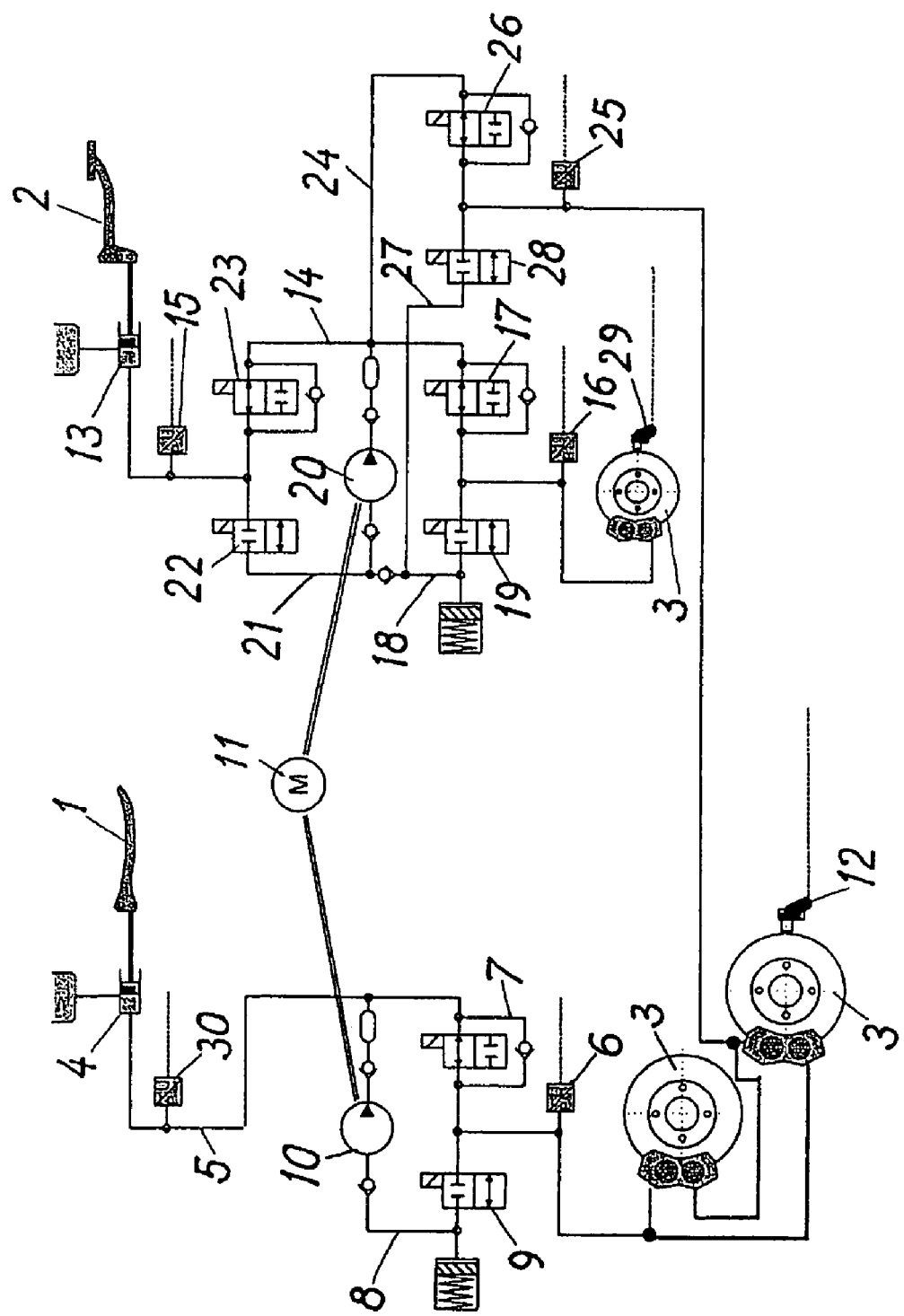
FIG. 1 shows a schematic illustration of a first embodiment of an integral brake for a motorbike.

The integral brake, illustrated schematically in FIG. 1, for a motorbike comprises a handbrake lever 1 for activating a first hydraulic brake device which acts on the front wheel, and a footbrake lever 2 for activating a second hydraulic brake device which acts on the rear wheel, and a third brake device which acts on the front wheel. While only one brake disk 3 is attached to the rear wheel of the motorbike, two brake disks 3 are attached to the front wheel. Each of these brake disks 3 is assigned a brake caliper in which one or more pressure chambers are formed. The handbrake lever 1 acts on a handbrake cylinder 4 which is connected via a line 5 to the two brake calipers which are assigned to the front wheel. For reasons of symmetry, three pressure chambers are formed in each of the two front brake calipers, and the line 5 is connected to the two outermost pressure chambers. A pressure sensor 30 which measures the pressure generated using the handbrake cylinder 4 and a pressure sensor 6 which measures the activation pressure of the front hydraulic brake device are arranged in the line 5. A rotational speed sensor 12 measures the rotational speed of the front wheel. A pressure modulator which reduces the pressure prevailing in a line 5 as soon as the front wheel locks is integrated into the line 5. This pressure modulator comprises an inlet valve 7 which is arranged in the line 5, and a line 8 which bypasses the inlet valve 7, with an outlet valve 9 and a pump 10 being arranged in the bypass line 8. The pump 10 has a drive connection to an electric motor 11.

The footbrake lever 2 is coupled to a footbrake cylinder 13 which is connected via a line 14 to the hydraulic brake device which acts on the rear wheel. To be more precise, the line 14 is connected to the pressure chamber or chambers which are formed in the brake caliper assigned to the rear brake disk 3. A pressure sensor 15 which measures the pressure generated using the footbrake cylinder 13 and a pressure sensor 16 which measures the activation pressure of the rear hydraulic brake device are arranged in the line 14. A pressure modulator which is of basically similar design to the pressure modulator which is integrated into the line 5 is integrated into the line 14. This pressure modulator comprises an inlet valve 17 which is arranged in the line 14 and a line 18 which bypasses the latter and in which an outlet valve 19 and a pump 20 are arranged. The pump 20 has a drive connection to the electric motor 11. The pump 20 is connected to the line 14 via an intake line 21. A suction valve 22 is arranged in the intake line 21, and a parting valve 23 is arranged in the line 14, downstream of the junction with the intake line 21. A line 24 is connected to the line 14 in the region between the parting valve 23 and the inlet valve 17. The line 24 is connected to the central pressure chamber of each of the two brake calipers which are attached to the front wheel. A pressure sensor 25 which measures the activation pressure of the brake device which acts on the front brake disks 3 is arranged in the line 24. In addition, a pressure modulator is integrated into the line 24. This pressure modulator comprises an inlet valve 26 which is arranged in the line 24 and a line 27 which bypasses it and in which an outlet valve 28 is arranged and which is connected to the bypass line 18 on the suction side of the pump 20.

A rotational speed sensor 29 is also assigned to the rear wheel, in a similar way to the front wheel.

The two rotational speed sensors 12 and 29, the four pressure sensors 6, 15, 16 and 25, the electric motor 11, the solenoid valves 7, 9, 17, 19, 26, 28 of the three pressure modulators, and the intake valve 22 and parting valve 23 are connected to an electronic control unit (not shown).

A certain distribution of the braking force applied to the front and rear wheels is necessary to decelerate the vehicle in an optimum way.

This ideal distribution of braking force is illustrated in the diagram according to FIG. 4. As the braking force at the front wheel increases, the optimum braking force also rises at the rear wheel before dropping again after a maximum value has been reached. If the braking force which is applied to the front wheel is so large that the rear wheel begins to lift off, the braking force which is applied to the rear wheel then drops to zero. In addition, a group of straight lines which correspond to a specific delay value is shown in the diagram according to FIG. 4. The point of intersection of a straight line with the curve for the ideal braking force distribution yields the optimum front or rear braking force for the respective deceleration.

The pressure generated in the handbrake cylinder 4 or in the footbrake cylinder 13 using the handbrake lever 1 or, respectively, the footbrake lever 2 corresponds to a specific deceleration factor which rises linearly with the pressure, as shown in FIGS. 2 and 3. If braking is carried out using the handbrake lever 1 or footbrake lever 2, it is then possible to use the pressure measured by the pressure sensors 30 and 15 as the basis for determining the deceleration factor which corresponds to said pressure and which reflects the deceleration desired by the rider. From the diagram according to FIG. 4, it is possible to determine the braking forces which are associated with this deceleration factor and which are to be applied for optimum distribution to the front and rear wheels of the motorbike. The diagrams according to FIGS. 2, 3 and 4 are stored in the electronic control device of the integral brake.

The method of operation of the integral brake which is illustrated in the drawing will be explained below.

Firstly, the case in which the motorbike is braked solely by activating the handbrake lever will be considered. Pressure is increased in the line 5 by activating the handbrake lever 1. On the basis of this pressure $p_{v1}$ determined by the pressure sensor 30 it is possible to determine the associated deceleration factor $a_{v1}$ from the diagram according to FIG. 2. On the basis of this deceleration factor $a_{v1}$ it is then possible to determine, from the diagram according to FIG. 4, the optimum braking force which is to be applied to the rear wheel for such deceleration, and thus the corresponding braking pressure. As already mentioned, the pressure with which the brake device assigned to the rear wheel needs to be activated to achieve an optimum braking force distribution is determined by the electronic control unit. The electric motor 11 is then started in order to drive the pump 20. In this context, the suction valve 22 and the inlet valve 17 are opened while the parting valve 23 and the outlet valve 19 are closed. For this reason, a pressure is increased in the line 14. If the pressure measured by the pressure sensor 19 arranged in this line corresponds to the pressure determined by the electronic control unit, the pump 20 is switched off. The force which corresponds to an optimum distribution of the braking force applied to the front and rear wheels is therefore applied to the brake calipers which are assigned to the two front brake disks 3 and the rear brake disk 3. If the front or rear wheel happens to lock, the activation pressure prevailing in the line 5 or 14 is reduced in a known fashion by means of the pump 10 or 20.

In the braking process described above, the inlet valve 26 and outlet valve 28 are closed. However, in order to reduce the force which is to be applied to the handbrake lever 1, the corresponding pressure modulator can also be activated, i.e. the inlet valve 26 is opened in order to support, via the line 24, the brake calipers which are assigned to the front brake disks. In this case, the pressures which are measured by the pressure sensors 6 and 25 must be added and the associated deceleration factor must be determined from the diagram according to FIG. 2 on the basis of the corresponding sum value. The activation pressure which is necessary for optimum braking force distribution in the line 14 can then be determined for the brake device assigned to the rear wheel, from the diagram according to FIG. 4.

If the footbrake lever 2 alone is activated, a pressure $p_{h1}$ is increased in the lines 14 and 24. In an analogous fashion, pressure determined by the pressure sensor 15 is used as the basis for determining the corresponding deceleration factor $a_{h1}$ by means of the diagram according to FIG. 3, and this deceleration factor can be used as the basis for determining, by means of FIG. 4, the corresponding optimum braking force to be applied to the front wheel. If this pressure is above the pressure generated by the rider, the necessary, additional pressure is increased in the line 24. For this purpose, the pump 20 is driven by means of the electric motor 11, the suction valve 22 is opened and the parting valve 23 is closed. If the pressure, measured by the pressure sensor 25, in the line 24 reaches the predetermined value, the inlet valve 26 can be closed and the pump 20 is switched off. If the activation pressure prevailing in the line 14 is lower than the activation pressure prevailing in the line 24, pressure must be correspondingly reduced using the pump 20 by closing the inlet valve 17 and opening the outlet valve 19. In an analogous fashion, the pressure in the lines 14 and 24 can be reduced if the front wheel and/or the rear wheel locks.

If the footbrake lever 2 is additionally activated using the handbrake lever 1 after a braking process has been initiated, an additional pressure $p_{h2}$ is increased by the footbrake cylinder 13, said pressure $p_{h2}$ being measured with the pressure sensor 15. By means of FIG. 3, the deceleration factor $a_{h2}$ which is associated with the measured pressure $p_{h2}$ is determined and added to the deceleration factor $a_{v1}$ which is defined by the activation pressure $p_{v1}$ prevailing in the line 5. With the new deceleration factor which is formed from the sum of the deceleration factors $a_{v1}$ and $a_{h2}$, the braking forces which correspond to this change to deceleration factor and which are to be applied to the front wheel or rear wheel are determined by reference to the diagram according to FIG. 4. In order to obtain these braking forces, the activation pressures prevailing in the lines 14 and 24 must be correspondingly increased. It may also be the case that the pressure prevailing in the line 14 has to be reduced, which depends on whether the value is to the left or right of the maximum value shown in FIG. 4. Since the activation pressure prevailing in the line 5 remains constant, the handbrake lever 1 is not affected by the additional activation of the footbrake lever 2. For this reason, no feedback effects at all occur at the handbrake lever 1.

If the footbrake is activated first and then the handbrake, a pressure $p_{v2}$ is increased in the line 5 by the handbrake cylinder 4 and an additional braking force is applied to the front wheel, and the deceleration of the vehicle is correspondingly increased. The activation pressure prevailing in the line 5 is measured by the pressure sensor 6 and the deceleration factor $a_{v2}$ associated with this pressure $p_{v2}$ is determined by means of FIG. 2. This deceleration value $a_{v2}$ is added to the deceleration factor $a_{h1}$ defined by the activation of the footbrake, and the associated values for the braking forces to be applied to the front and rear wheels are determined by means of FIG. 4 on the basis of the new deceleration factor formed in this way. Since the pressure prevailing in the line 5 is predefined by the rider, the necessary increase in the braking force acting on the front wheel must be brought about by a corresponding increase in the operating pressure prevailing in the line 24. The corresponding pressure modulators are controlled by the electronic control unit in order to adjust the operating pressures prevailing in the lines 24 and 14 to the values necessary for optimum distribution of braking force. Since the pressure prevailing in the line 5 is not affected by these control processes, the handbrake lever 1 also remains unaffected so that the rider has a normal braking sensation.

Figure 5:
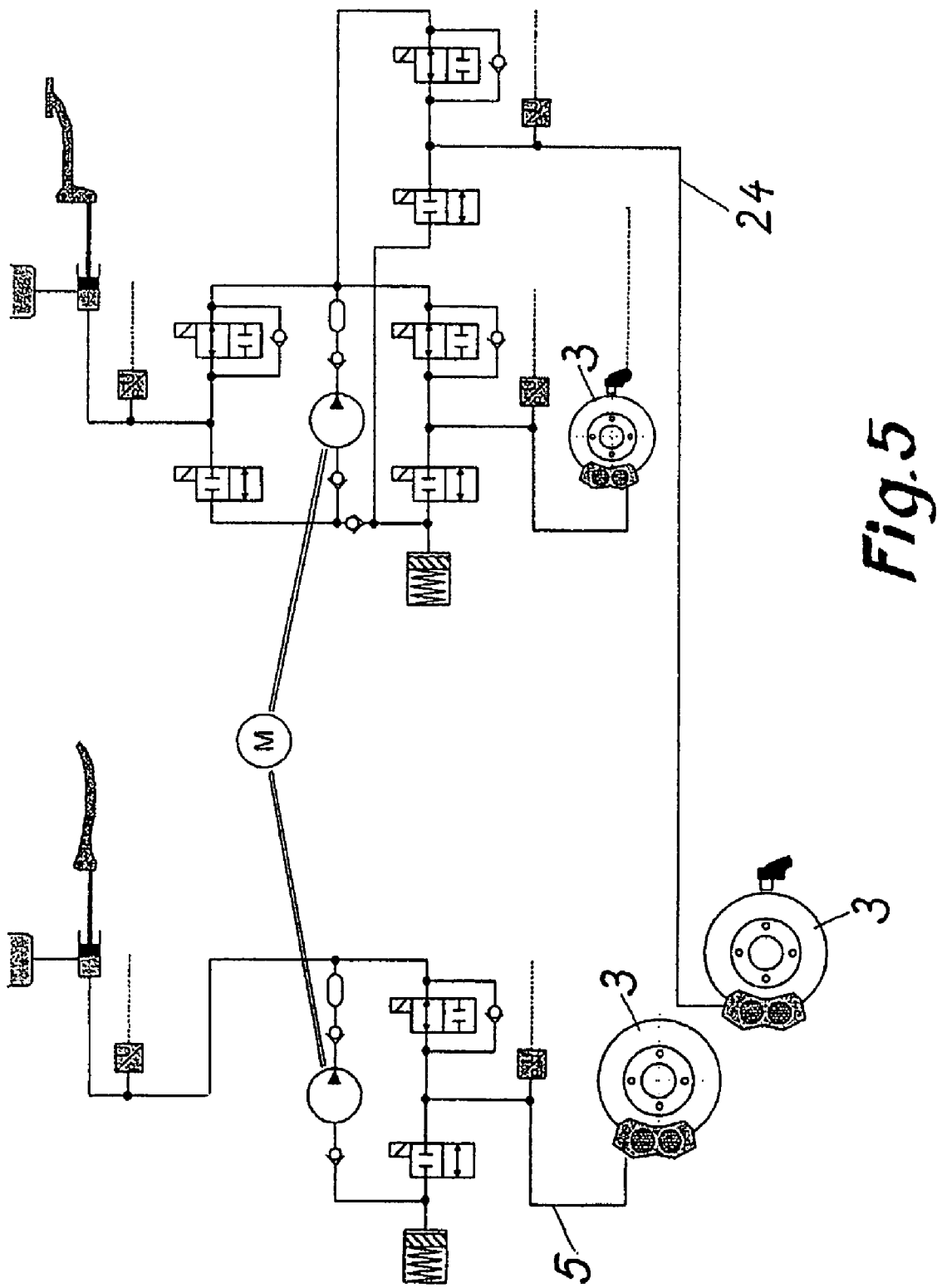
FIG. 5 shows a second exemplary embodiment of an integral brake for a motorbike.

Instead of the embodiment shown in FIG. 1, in which the front brake calipers have three pressure chambers, it is also possible to use conventional brake calipers with just one pressure chamber. As illustrated in FIG. 5, one of the two front brake calipers is connected to the line 5, while the other front brake caliper is connected to the line 24. For the rest, the design and the method of operation of the integral brake shown in FIG. 5 are identical to those of the embodiment according to FIG. 1.

Alternatively, instead of the ideal (optimum) distribution of braking force between the front and rear wheels, it is also possible to implement any other distribution.

Ideally, the integral brake is operated with five pressure sensors as illustrated and described. However, it is basically also possible to operate with four pressure sensors 6, 15, 16 and 25 and to calculate the missing fifth pressure in the system by means of a pressure model.

LIST OF REFERENCE NUMERALS

1 Handbrake lever
2 Footbrake lever
3 Brake disk
4 Handbrake cylinder
5 Line
6 Pressure sensor
7 Inlet valve
8 Bypass line
9 Outlet valve
10 Pump
11 Electric motor
12 Rotational speed sensor
13 Footbrake cylinder
14 Line
15 Pressure sensor
16 Pressure sensor
17 Inlet valve
18 Bypass line
19 Outlet valve
20 Pump
21 Intake line
22 Suction valve
23 Parting valve
24 Line
25 Pressure sensor
26 Inlet valve
27 Bypass line
28 Outlet valve
29 Rotational speed sensor
30 Pressure sensor

The invention claimed is:

1. An integral brake for a motorbike, comprising
a handbrake lever,
a handbrake cylinder which can be activated using the handbrake lever,
a first hydraulic brake device which acts on the front wheel,
a first line which connects the handbrake cylinder to the first hydraulic brake device,
a first pressure sensor which measures the activation pressure of the first hydraulic brake device,
a footbrake lever,
a footbrake cylinder which can be activated using the footbrake lever,
a second hydraulic brake device which acts on the rear wheel,
a second line which connects the footbrake cylinder to the second hydraulic brake device,
a third hydraulic brake device which acts on the front wheel,
a third line which connects the footbrake cylinder to the third hydraulic brake device,
a second pressure sensor which measures the activation pressure of the second hydraulic brake device,
a third pressure sensor which measures the activation pressure of the third hydraulic brake device,
a fourth pressure sensor which measures the pressure generated by the footbrake cylinder,
a pressure modulator which is assigned to the second and third lines,
an electronic control unit in which the theoretical deceleration values corresponding to the pressures generated using the handbrake cylinder or using the footbrake cylinder and the optimum distribution—necessary to achieve these theoretical deceleration values—of the braking forces acting on the front wheel and rear wheel and the braking pressures which are necessary for this are stored,
where the electronic control unit controls the pressure modulator in accordance with the signal supplied by the four pressure sensors in order to adjust the activation pressures of the second and third hydraulic brake devices to the programmed values.

2. The integral brake as claimed in claim 1, wherein a pressure modulator is also assigned to the first line, wherein a rotational speed sensor is assigned to the front wheel and to the rear wheel, respectively, and wherein the electronic control unit controls the pressure modulators in accordance with the signals supplied by the two rotational speed sensors, in order to prevent the front or rear wheel from locking.

3. The integral brake as claimed in claim 2, wherein the pressure modulators each comprise an inlet valve which is arranged in the respective first, second and third lines, a line which bypasses each respective inlet valve, an outlet valve which is arranged in the respective bypass line, and a pump which is arranged in the respective bypass line between the outlet valve and the first, second or third line.

4. The integral brake as claimed in claim 1, wherein two brake disks are attached to the front wheel, each of which brake disks is assigned a brake caliper which has three pressure chambers, the two outermost of which are connected to the first line and the inner one of which is connected to the third line.

5. The integral brake as claimed in claim 1, wherein two brake disks are attached to the front wheel, each of which brake disks is assigned a brake caliper which has at least one pressure chamber, with the pressure chamber or chambers of one brake caliper being connected to the first line, and the pressure chamber or chambers of the other brake caliper being connected to the third line.

6. An integral brake for a motorbike, comprising a handbrake lever, a handbrake cylinder which can be activated using the handbrake lever, a first hydraulic brake device which acts on the front wheel, a first line which connects the handbrake cylinder to the first hydraulic brake device, a first pressure sensor which measures activation pressure of the first hydraulic brake device, a footbrake lever, a footbrake cylinder which can be activated using the footbrake lever, a second hydraulic brake device which acts on the rear wheel, a second line which connects the footbrake cylinder to the second hydraulic brake device, a third hydraulic brake device which acts on the front wheel, a third line which connects the footbrake cylinder to the third hydraulic brake device, a second pressure sensor which measures the activation pressure of the second hydraulic brake device, a third pressure sensor which measures the activation pressure of the third hydraulic brake device, a fourth pressure sensor which measures the pressure generated by the footbrake cylinder, a first pressure modulator which is assigned to the first line, a second pressure modulator which is assigned to the second line, a third pressure modulator which is assigned to the third line, and an electronic control unit in which the theoretical deceleration values corresponding to the pressures generated using the handbrake cylinder or using the footbrake cylinder and the optimum distribution—necessary to achieve these theoretical deceleration values—of the braking forces acting on the front wheel and rear wheel and the braking pressures which are necessary for this are stored, wherein the electronic control unit controls the first, second and third pressure modulators in accordance with the signal supplied by the four pressure sensors in order to adjust the activation pressures of the first, second and third hydraulic brake devices to the programmed values.

* * * * *